United States Patent Office 2,930,802
Patented Mar. 29, 1960

2,930,802

OXIDATION OF ALKYLNAPHTHALENES

Robert S. Aries, Stamford, Conn.

No Drawing. Application September 16, 1957
Serial No. 683,974

9 Claims. (Cl. 260—346.4)

This invention relates to the oxidation of alkylnaphthalenes. More particularly, the invention is concerned with a two-stage method for oxidation and conversion of alkylnaphthalenes to phthalic anhydride.

The most important commercial method for the production of phthalic anhydride is the oxidation of naphthalene by air. The increasing demand for phthalic anhydride and the limited availability of naphthalene has compelled manufacturers of phthalic anhydride to look for additional sources of raw material, and to some extent this has been found in o-xylene which under appropriate conditions can also be oxidized to phthalic anhydride.

Naphthalene and alkyl substituted naphthalenes such as the methyl naphthalenes are present in small amounts in certain streams from catalytic cracking processes. The concentrations in these streams are low and the alkylnaphthalenes are present to a larger extent than naphthalene itself, so that currently the recovery of naphthalene from these refinery streams is not considered economical. However, if, for example, methylnaphthalenes could be utilized as an efficient source of phthalic anhydride the economics of the recovery of the total naphthalenemethylnaphthalenes fraction from such refinery streams would be improved and additional phthalic anhydride could be produced.

The yields of phthalic anhydride obtained by conversion of alkylnaphthalenes, such as methylnaphthalene, by known methods, are quite low. For example, in U.S. Patent 1,591,619 methylnaphthalene is converted in the vapor phase in presence of an air stream and using a vanadium or molybdenum oxide catalyst, directly to phthalic anhydride. The low yield of only 28–40% obtainable by this process is said to arise from the fact that excessive heat is generated since the oxidation of the methyl group of the methylnaphthalene to carbon dioxide and water, and the conversion of the naphthalene nucleus are both exothermic reactions. Another approach to utilization of alkylnaphthalenes is to dealkylate them to naphthalene, and then oxidize the latter to phthalic anhydride. Both the aforementioned prior art processes require vapor phase operation, which is inherently expensive, and result in noncommercial yields.

In accordance with this invention, I have discovered a novel, efficient and economical process for the oxidation and conversion of alkylnaphthalenes in high yield to phthalic anhydride. My novel process involves first an oxidation stage which converts the alkyl groups to carboxyl groups, thereby forming naphthoic acid, and leaving the naphthalene nucleus unaffected. In the second stage of the process, the naphthoic acid is converted to phthalic anhydride by procedure wholly analogous to that conventionally used for direct conversion of naphthalene to phthalic anhydride. It was unexpected that naphthoic acid could be converted catalytically to phthalic anhydride by means of vanadium type catalysts. It was also found unexpectedly that the first oxidation stage may be conducted in the presence of naphthalene itself, and that the oxidation of alkyl groups proceeds selectively, leaving any naphthalene originally present, as for example, when using refinery streams, or any introduced naphthalene, unchanged. Such naphthalene is thus fully available for conversion to phthalic anhydride in the second stage of the process. The first stage is conducted in the liquid phase, since many alkylnaphthalenes, particularly commercial mixtures, are either liquid at ordinary temperatures, or have comparatively low melting points.

By conducting the reaction in accordance with my invention in two stages, the problem of excessive heat removal is eliminated, since the heat generated can readily be taken care of in each stage by conventional cooling means. This avoids the alternative of overloading the heat removal system (mercury or Dowtherm) which is used in single stage conversions, or that of using a large excess of air to the amount of charge in order to regulate temperatures.

Another advantage of my novel procedure is that the heat liberated in the oxidation of the alkyl group or groups is dissipated in that step and does not affect the subsequent oxidation in a separate and distinct step, of the naphthalene and naphthoic acid to phthalic anhydride. The heat of oxidation of naphthoic acid to phthalic anhydride is substantially equal to that of naphthalene to phthalic anhydride, and thus the second step, the oxidation to phthalic anhydride of the pre-oxidized alkyl naphthalenes mixture, is operationally analogous to that of conventional naphthalene oxidation the details of which are quite precisely known to those skilled in the art.

Furthermore, at the temperature of oxidation of the naphthoic acid-naphthalene mixture, the naphthoic acid is decarboxylated to naphthalene, so that the oxidation of pre-oxidized alkylnaphthalenes is essentially both operationally and chemically the oxidation of naphthalene. The incidental decarboxylation of naphthoic acid to naphthalene involves only a small heat effect, and that small effect is quite inconsequential as compared to the very large liberation of heat by the oxidation of naphthalene to phthalic anhydride. In fact, if the naphthoic acid contains some unconverted alkylnaphthalenes, the second stage oxidation of the naphthoic acid containing or not containing preformed naphthalene, but containing some alkylnaphthalenes, proceeds in high yield quite surprisingly, the naphthoic acid apparently providing a moderating effect on the oxidation of the unchanged alkylnaphthalenes. This is important because it permits the first stage oxidation to be carried out under conditions not requiring too precise control, as it is not essential to oxidize the alkylnaphthalenes completely to naphthoic acids.

The first or pretreatment stage of my novel method comprises the liquid phase oxidation of the alkyl side chains by air or other oxygen-containing gas in the presence of an oxidation catalyst, which is preferably a cobalt salt, such as cobalt naphthenate or cobalt acetate. In this liquid phase oxidation which is conducted at relatively low temperatures, such as 150–180° C., only the side chains of the alkylnaphthalene feed stock are oxidized. Just a toluene is oxidized under these conditions in high yield to benzoic acid, I have found that alkylnaphthalenes, such as methylnaphthalenes, are oxidized under analogous conditions in high yield to naphthoic acids.

The reaction is essentially

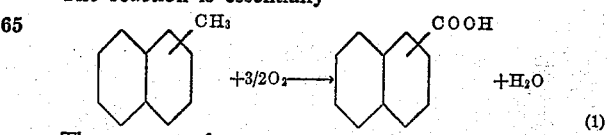

(1)

The amount of oxygen consumed per mole of methylnaphthalenes is 3/2 moles which is a rough approximation of the amount of heat liberated. Comparison of the above Equation 1 with subsequent Equations 3 and 4, indicates that much less heat is liberated in this step than in (3) or (4) and as this step is conducted quite separately from the subsequent oxidation to phthalic anhydride this heat can readily be removed.

The liquid phase oxidation of the alkylnaphthalenes or of a mixture of the alkylnaphthalenes with naphthalene, at the temperature indicated, in the presence of a cobalt catalyst, does not lead to the oxidation of the naphthalene nucleus, but to a mixture of naphthoic acids, naphthalene (either present in the original material or produced in very small amount by decarboxylation at the oxidation temperature) and unconverted alkylnaphthalenes.

Alkylnaphthalenes which can be used as starting materials include 1- and 2-methylnaphthalenes, 1,2-dimethylnaphthalene, ethyl and propyl and higher alkylated naphthalenes, since the alkyl chains, regardless of length, are converted to —COOH. Thus ethylnaphthalenes yield the same naphthoic acids as methylnaphthalenes, but more heat per mole is liberated in the case of the ethyl-derivatives than in the case of the methyl-derivatives. This however is not a serious problem as the liquid phase exercises a moderating effect on the rise in temperature.

When the reaction of oxidation by air in liquid phase is terminated, which occurs generally before all the alkylnaphthalene content has been oxidized, part or all of the unconverted alkylnaphthalenes may be distilled out and recycled to the next liquid phase oxidation run, or naphthalene may be added to the mixture to bring the percentage of alkylnaphthalene content down to the desired value.

It will be clear from the previous discussion that so far as the subsequent vapor phase oxidation to phthalic anhydride is concerned, naphthoic acid is equivalent to naphthalene, since at the temperature of the vapor phase oxidation (of the order of 450° C.) the naphthoic acids are decarboxylated to naphthalene in accordance with the equation:

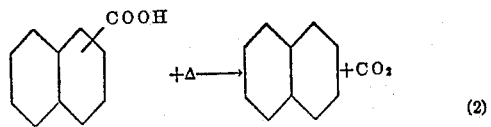
(2)

The oxidation of naphthalene to phthalic anhydride in the vapor phase by air over a solid catalyst follows the equation:

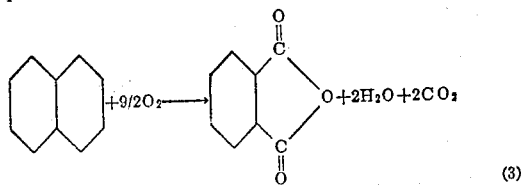
(3)

which is too well known to require any description here. Quite analogously the naphthoic acids are oxidized in the vapor phase by air over a solid catalyst such as a vanadium catalyst to phthalic anhydride:

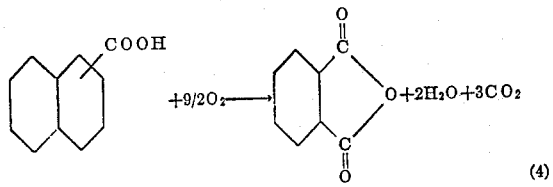
(4)

The vapor phase oxidation equipment used in the second stage of the method of this invention is conventional in principle. A heated reciprocating proportioning pump may be used to feed the liquid mixtures into the reacting section. Clean, dry, filtered air at 20 pounds gauge pressure is metered in a rotameter. The heated liquid feed and air is introduced, for example, into a vaporizer consisting of a ½ inch stainless steel coil of 9½ turns and a coil diameter of 10 inches. The vaporizer is set in a bath containing heat transfer salt (sodium nitrate-potassium nitrate mixture). The bath is heated, for example, by electrical immersion heaters and agitated to provide uniform temperatures to the vaporizer. At the feed rates and temperature used all the mixtures employed were found to be completely vaporized, except for a very small amount of non-volatile material, chiefly inorganic, which was periodically cleaned out of the vaporizer coil.

The vaporized mixture from the vaporizer was introduced into a reactor consisting of one inch stainless steel pipe 3 feet long set within a larger pipe 4 inches in diameter. The annular space between the reactor pipe and the enclosing 4 inch pipe contained heat transfer salt which was circulated by an external pump. The heat transfer salt bath was heated electrically. Temperatures were measured by means of thermocouples in thermowells both in the annular space and within the reactor space. The reactor space was loosely filled with catalyst pellets. The reaction products were recovered in a series of air-cooled condensers, water cooled condensers, cotton filters and flasks in water-ice baths and flasks in solid carbon dioxide baths.

The following examples will illustrate the invention, but it is not to be regarded as limited thereto.

*Example 1*

1 kilo of 1-methylnaphthalene and 2.0 grams of cobalt naphthenate were charged into an agitated autoclave. The temperature was raised to 150° C. and the system was pressurized to 500 pounds per square inch gage with air. Air was then pumped through the mixture at 3 liters per minute for 15 hours. The hot liquid product of naphthoic acid and methylnaphthalene was fed into a reactor charged with 100 ml. of catalyst particles prepared by thermally decomposing ammonium metavanadate on 8–10 mesh silica gel. The data from the run were:

| | |
|---|---|
| Feed rate | 25 grams per hour. |
| Air rate | 200 liters per hour. |
| Vaporizer temp. | 300° C. |
| Catalyst temp. | 425° C. |
| Time | 43 hours. |

The yield of phthalic anhydride obtained was 58 mole percent on the 1-methylnaphthalene charge. No naphthoic acid or unreacted methylnaphthalene could be detected in the reaction product.

*Example 2*

An aliquot of the product from a liquid phase oxidation of 1-methylnaphthalene carried out as in Example 1, was distilled under moderate vacuum (absolute pressure about 100 mm. of Hg) until all the unreacted 1-methylnaphthalene was distilled out. This product, substantially free of methylnaphthalene was reacted with air in the vapor phase reactor of Example 1 under the following conditions:

Catalyst—100 ml. of commercial vanadium pentoxide catalyst used in converting naphthalene to phthalic anhydride on the industrial scale.
Feed rate—35 grams per hour.
Air rate—250 liters per hour.
Vaporizer temp.—400° C.
Catalyst temp.—450° C.

Assuming the feed to be naphthoic acid the yield of phthalic anhydride was 86 mole percent.

A comparison run made with naphthalene as feed stock gave a yield of 84 mole percent.

*Example 3*

A 1:1 mixture of 1-methylnaphthalene and 2-methylnaphthalene was oxidized in the autoclave with air at 175° C. in the presence of 0.15% cobalt acetate as catalyst. A weighed aliquot of the reaction product was oxidized in the vapor phase reactor at 460° C. catalyst temperature, using a vanadium on alumina catalyst. The feed rate with 30 grams per hour and the air rate 275 liters per hour. The yield of phthalic anhydride obtained was 64 mole percent on the methylnaphthalene mixture.

*Example 4*

To the mixture obtained as in Example 2, resulting from the partial vacuum distillation of a liquid phase oxidation, 1-methylnaphthalene was added so that it composed 25% of the total mixture. This was then oxidized as in the case of Example 2. A yield of 78 mole percent of phthalic anhydride was obtained. This yield was based on original methylnaphthalene used plus added methylnaphthalene and credited with methylnaphthalene distilled out.

*Example 5*

A 1:1:1 mixture of 1-methylnaphthalene, 2-methylnaphthalene and naphthalene was oxidized in the liquid phase under the same conditions as in Example 1. The unreacted naphthalene and the unreacted methylnaphthalenes were fractionally separated out from the oxidate by fractional distillation in a moderate vacuum. The naphthalene fraction was returned to the residue, and this mixture was fed to the vapor phase oxidation reactor, using the following conditions:

| | |
|---|---|
| Catalyst | Vanadium pentoxide on silica gel. |
| Vaporizer temp. | 415° C. |
| Catalyst temp. | 475° C. |
| Feed rate | 35 grams per hour. |
| Air rate | 300 liters per hour. |

A yield of 83 mole percent of phthalic anhydride based on methylnaphthalene and naphthalene consumed was obtained.

*Example 6*

2-ethylnaphthalene was oxidized in the liquid phase under the same conditions as in Example 2, and the hot liquid product was similarly oxidized in the vapor phase, as in the case of Example 2, with a 62 mole percent yield on the ethylnaphthalene charge.

I claim:

1. Method for the conversion of lower alkylnaphthalenes to phthalic anhydride which comprises in a first stage oxidizing said lower alkylnaphthalenes to naphthoic acid in the liquid phase by means of air in the presence of a cobalt containing oxidation catalyst at a temperature between about 150° and 180° C., and in a second stage converting said naphthoic acid in the vapor phase in the presence of air, and a vanadium containing oxidation catalyst at a temperature between about 425° and 475° C., to phthalic anhydride.

2. Method for the conversion of mixtures of lower alkylnaphthalenes and naphthalene to phthalic anhydride which comprises in a first stage oxidizing the lower alkylnaphthalenes in said mixture to naphthoic acid in the liquid phase, by means of air in the presence of a cobalt containing oxidation catalyst at a temperature between about 150° and 180° C., and in a second stage converting said naphthoic acid and naphthalene in the vapor phase in the presence of air and a vanadium containing oxidation catalyst at a temperature between about 425° and 475° C., to phthalic anhydride.

3. Method for the conversion of lower alkylnaphthalenes to phthalic anhydride which comprises in a first stage oxidizing the lower alkylnaphthalenes to naphthoic acid in the liquid phase by means of air in the presence of a cobalt containing oxidation catalyst at a temperature between about 150° and 180° C., removing any unchanged lower alkylnaphthalenes by distillation, and in a second stage converting said naphthoic acid in the vapor phase in the presence of air and a vanadium containing oxidation catalyst at a temperature between about 425° and 475° C., to phthalic anhydride.

4. Method for the conversion of methylnaphthalene to phthalic anhydride which comprises in a first stage oxidizing the methylnaphthalene to naphthoic acid in the liquid phase by means of air in the presence of cobalt acetate at a temperature between about 150° and 180° C., and in a second stage converting said naphthoic acid in the vapor phase in the presence of air and vanadium pentoxide at a temperature between about 425° and 475° C., to phthalic anhydride.

5. Method for the conversion of methylnaphthalene to phthalic anhydride which comprises in a first stage oxidizing the methylnaphthalene to naphthoic acid in the liquid phase by means of air in the presence of cobalt acetate and at a temperature between about 150° and 180° C., and in a second stage converting said naphthoic acid in the vapor phase in the presence of air and vanadium pentoxide at a temperature between about 425° and 475° C., to phthalic anhydride.

6. The method of claim 1 in which the oxidation catalyst in the first stage is cobalt acetate.

7. The method of claim 1 in which the catalyst in the second stage is vanadium pentoxide.

8. The method of claim 1 in which the lower-alkylnaphthalene is ethylnaphthalene.

9. The method of claim 2 in which the lower-alkylnaphthalenes comprise a mixture of 1-methylnaphthalene and 2-methylnaphthalene.

References Cited in the file of this patent

UNITED STATES PATENTS

| | | |
|---|---|---|
| 1,591,619 | Gibbs | July 6, 1926 |
| 1,963,258 | Brode | June 19, 1934 |
| 2,294,130 | Porter | Aug. 25, 1942 |

OTHER REFERENCES

Shreve et al.: Ind. and Eng. Chem., vol. 35, pp. 279–88.